United States Patent
Lee et al.

(10) Patent No.: US 8,902,556 B2
(45) Date of Patent: Dec. 2, 2014

(54) PROTECTION CIRCUIT

(75) Inventors: Yu-Lung Lee, Miaoli County (TW); Jung-Hui Hsu, Taipei County (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 807 days.

(21) Appl. No.: 12/911,946

(22) Filed: Oct. 26, 2010

(65) Prior Publication Data
US 2012/0063051 A1 Mar. 15, 2012

(30) Foreign Application Priority Data
Sep. 13, 2010 (TW) ................. 99130915 A

(51) Int. Cl.
*H02H 5/04* (2006.01)
*H02H 9/04* (2006.01)

(52) U.S. Cl.
CPC .............. *H02H 5/047* (2013.01); *H02H 9/042* (2013.01)
USPC ............ 361/104; 361/118; 361/103; 361/105

(58) Field of Classification Search
USPC .................................. 361/118, 104, 103, 105
See application file for complete search history.

(56) References Cited

U.S. PATENT DOCUMENTS

| 4,237,513 | A | * | 12/1980 | Foldes | ................. | 361/103 |
| 5,047,891 | A | * | 9/1991 | Nedriga | ................ | 361/117 |
| 6,281,780 | B1 | | 8/2001 | Sugiyama et al. | | |
| 2008/0129440 | A1 | * | 6/2008 | Ho | ..................... | 337/5 |
| 2010/0047674 | A1 | | 2/2010 | Ryu et al. | | |

FOREIGN PATENT DOCUMENTS

| CN | 101517781 A | 8/2009 |
| TW | 199230 | 2/1993 |

* cited by examiner

*Primary Examiner* — Zeev V Kitov
(74) *Attorney, Agent, or Firm* — Rosenberg, Klein & Lee

(57) ABSTRACT

A protection circuit includes a surge absorber, a switch device electrically connected to the surge absorber and having a first conductor and a second conductor, and a heat-shrinkable device disposed on an outer periphery of the surge absorber and shrinking in accordance with temperature of the surge absorber. The first conductor has a first connecting portion and a second connecting portion. The surge absorber is connected to the first connecting portion. When the switch device is in an initial state, the second connecting portion electrically contacts the second conductor, and when the heat-shrinkable device shrinks to separate the second connecting portion from the second conductor, the switch device is switched off.

16 Claims, 5 Drawing Sheets

PROTECTION CIRCUIT

BACKGROUND OF THE INVENTION

1. Field of the Invention

The present invention relates to a protection circuit, and particularly to a protection circuit utilizing shrinkage of a heat-shrinkable device.

2. Description of Prior Art

In general, surge absorbing elements, such as metal oxide varistor (MOV), are often installed in a circuit to avoid damage caused by transient voltage surge from a power supply system. Since the surge absorbing element generates much heat when the transient voltage surge is absorbed, the surge absorbing element may be burned itself and damage electronic elements in the neighborhood of the surge absorbing element.

Traditionally, a thermal cutoff fuse is disposed between the surge absorbing elements and the power supply system. The thermal cutoff fuse is fused by heat so as to cut off circuitry between the surge absorbing element and the power supply system. When in operation, the surge absorbing element may be at a temperature higher than the temperature detected by the thermal cutoff fuse, and the surge absorbing element may be associated with a service life shorter than the thermal cutoff fuse. Thus, the surge absorbing element may be burned before the thermal cutoff fuse is fused or at the same time when the thermal cutoff fuse is fused.

SUMMARY OF THE INVENTION

The invention provides a protection circuit including a heat-shrinkable element disposed on the periphery of a surge absorber. The heat-shrinkable element shrinks in accordance with heat generated by the surge absorber.

An embodiment of a protection circuit according to the present invention includes a surge absorber, a switch device electrically connected to the surge absorber and having a first conductor and a second conductor, and a heat-shrinkable device disposed on an outer periphery of the surge absorber. The first conductor has a first connecting portion and a second connecting portion. The heat-shrinkable device is connected to the first connecting portion. The heat-shrinkable device may shrink in accordance with temperature of the surge absorber. When the switch device is in an initial state, the second connecting portion electrically contacts the second conductor, and when the heat-shrinkable device shrinks to separate the second connecting portion from the second conductor, the switch device is in an off state.

Another embodiment of a protection circuit according to the present invention includes a surge absorber, a switch device electrically connected to the surge absorber and having a first conductor and a second conductor detachably connected to the first conductor, a blocking element adjacent to the switch device, and a heat-shrinkable device disposed around the surge absorber, the switch device and the blocking element. The heat-shrinkable device shrinks in accordance with temperature of the surge absorber. The heat-shrinkable device shrinks to move the blocking element to a position between the first conductor and the second conductor so as to open the switch device when the temperature of the heat-shrinkable device is within an operative temperature range.

The heat-shrinkable device shrinks in accordance with the temperature of the surge absorber in an operative temperature range to switch off the switch device for causing the protection circuit to be disconnected from the surge absorber before the surge absorber is burned or fails.

It is worth noting that since the heat-shrinkable device may not return to its initial state without the shrinkage so as to stay the switch device at the switch-off state.

For further understanding of the present invention, reference is made to the following detailed description illustrating the embodiments and examples of the present invention. The description is for illustrative purpose only and is not intended to limit the scope of the claim.

DETAILED DESCRIPTION OF THE INVENTION

Figure 1:
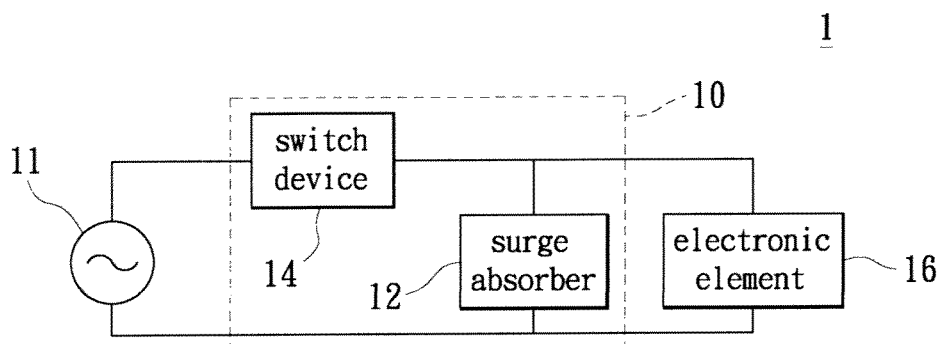
FIG. 1 is a block diagram of a protection circuit in accordance with an embodiment of the present invention.

Referring to FIG. 1, a protection circuit 10 comprises a surge absorber 12 and a switch device 14 electrically connected to a power supply 11. The surge absorber 12 is electrically connected to the switch device 14 and an electronic element 16. The described connection of the protection circuit 10 and the electronic element 16 is an example. It is worth noting that the protection circuit 10 may also be applied to a socket device or an electronic apparatus.

In this embodiment, the surge absorber 12 includes at least one surge absorbing element, such as a metal oxide varistor. The metal oxide varistor may be a non-linear resistance made of zinc oxide or other metal oxides. If the surge absorber 12 includes a plurality of surge absorbing elements, the surge absorbing elements may be in a serial, a parallel connection or a combination of both the serial and parallel connections. When one of the surge absorbing elements receives a surge current, the surge absorbing element is shorted to provide a current-dividing path so that a part of the surge current may flow along the current-dividing path to ensure the electronic element 16 may be shielded from the entire surge current. As the part of the entire surge current passes through the absorbing element, the temperature of the surge absorber 12 may increase.

Figure 2A:
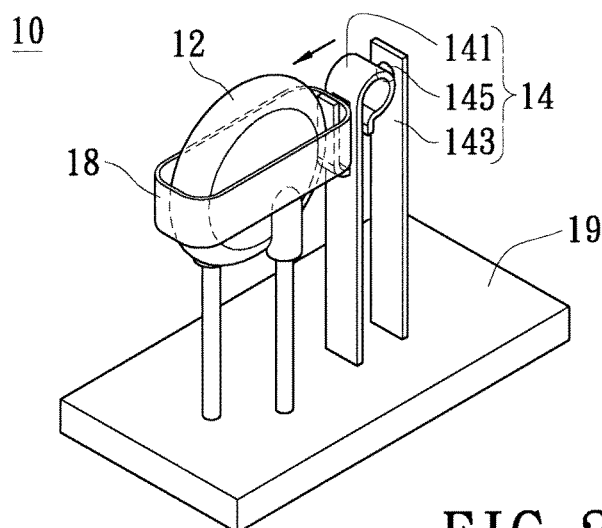
FIGS. 2A to 2B are schematic views of the protection circuit in accordance with a first embodiment of the present invention.

Referring to FIG. 2A, the surge absorber 12 and switch device 14 are disposed on a circuit board 19, and the surge absorber 12 is near the switch device 14.

In one implementation, the surge absorber 12 is circular in shape, strip-shaped or annular in shape. A heat-shrinkable device 18 is disposed on the periphery of the surge absorber 12 to enclose the surge absorber 12. As such, the heat-shrinkable device 18 may shrink in accordance with the temperature of the surge absorber 12. In one implementation, the heat-shrinkable device 18 has a plurality of vents (not shown) to dissipate heat of the surge absorber 12. The heat-shrinkable device 18 may be made of polyester or polyvinylchloride which is insulating and nonflammable. When the temperature of the surge absorber 12 is in a predetermined operative temperature range associated with the heat-shrinkable device 18, the heat-shrinkable device 18 may shrink in accordance with the real temperature of the surge absorber 12, driving the switch device 14 to cause the protection circuit 10 to shield the electronic element from the power supply 11 before the surge absorber 12 is burned or fails.

Figure 3:
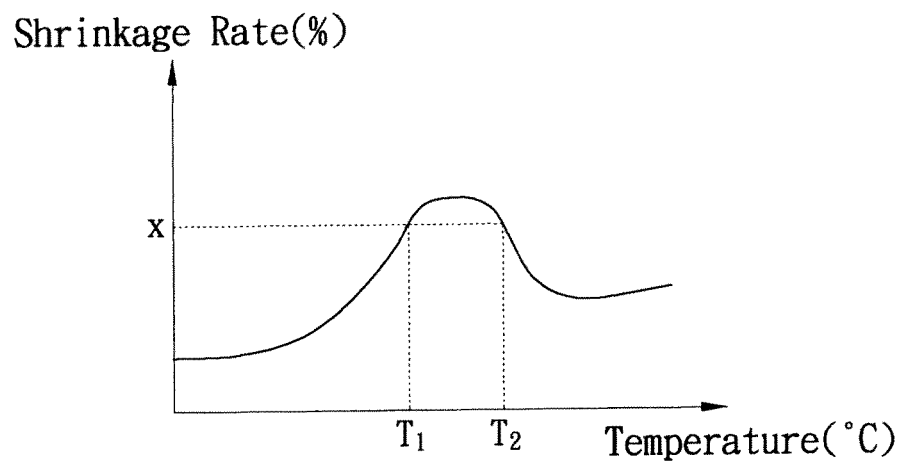
FIG. 3 shows a characteristic curve of an embodiment of a heat-shrinkable device of the protection circuit in accordance with the present invention.

FIG. 3 is an example of selection of the operative temperature range. Referring to FIG. 3, the operative temperature range of the heat-shrinkable device 18 is between a temperature range [T1, T2] in which a shrinkage rate of the heat-shrinkable device 18 is greater than or equal to a predetermined shrinkage rate. The shrinkage rate may be a transverse shrinkage rate of the heat-shrinkable device 18. The shrinkage rate may be obtained from the following formula:

$$S=(L_0-L)/L_0 \times 100\% \qquad (1)$$

S represents the shrinkage rate of the heat-shrinkable device 18, $L_0$ represents a transverse length before the heat-shrinkable device 18 shrinks, and L represents a transverse length after the heat-shrinkable device 18 shrinks.

It is worth noting that the heat-shrinkable device 18 is attached to the periphery of the surge absorber 12 with an adhesive. In another implementation, the heat-shrinkable device 18 may enclose the periphery of the surge absorber 12. When the protection circuit 10 operates, the switch device 14 may be switched off as the result of the shrinkage of the heat-shrinkable device 18. Since the shrinkage of the heat-shrinkable device 18 may not be undone, the switch device 14 may remain switched off to prevent the surge absorber 12 from burning due to the increase in the temperature of the surge absorber 12.

In one implementation, the material of the heat-shrinkable device 18 is selected based on whether the upper limit of the operative temperature range [$T_1$, $T_2$] of the selected material is substantially equal to a threshold temperature beyond which the surge absorber 12 fails. The heat-shrinkable device 18 shrinks largely before the surge absorber 12 fails. Consequently, the switch device 14 may be switched off before the surge absorber 12 fails as the result of the temperature spike. For example, when the threshold temperature of the surge absorber 12 is 150 degrees Celsius the material of the heat-shrinkable device 18 having the operative temperature range [$T_1$, $T_2$] between 125 to 150 degrees Celsius may be chosen. The shrinkage rate may reach 40% to 60% when the temperature of the heat-shrinkable device 18 is between 125 and 145 degrees Celsius. The heat-shrinkable device 18 shrinks largely before the surge absorber 12 fails so as to cause the switch device 14 to be switched off.

Figure 2B:
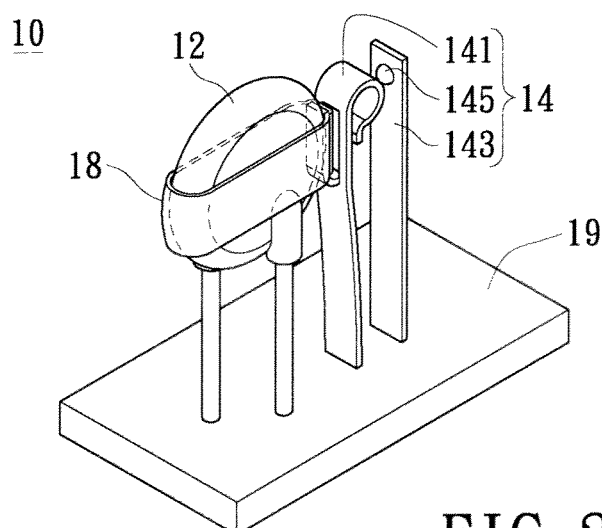

Referring to FIG. 2A, the switch device 14 comprises a first conductor 141 and a second conductor 143. When the switch device 14 operates in an initial state, the first conductor 141 is in contact with the second conductor 143 via a contact 145. The contact 145 may be a gold ball, a silver ball or a tin ball soldered on the first conductor 141 or the second conductor 143. The contact 145 may also be a protruding portion formed on the first conductor 141 or the second conductor 143. As shown in FIG. 2B, when the heat-shrinkable device 18 shrinks to separate the first conductor 141 from the second conductor 143, the switch device 14 may be switched off.

Figure 4A:
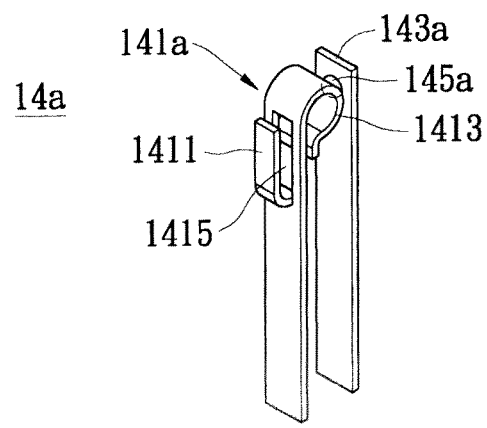
FIG. 4A is a schematic view of a first embodiment of a heat-shrinkable device of the protection circuit in accordance with the present invention.

Referring to FIG. 4A, a slot 1415 is formed on a first end of a first conductor 141a of the switch device 14a. The first conductor 141a also defines a first connecting portion 1411 and a second connecting portion 1413. A contact 145a is disposed on a first end of the second conductor 143a. In another implementation, the contact 145a may be formed on the second connecting portion 1413.

In one implementation, the first connecting portion 1411 may be an extending portion, and the second connecting portion 1413 may be a base portion. The first connecting portion 1411 may be attached to an outer surface or an inner surface of the heat shrinkable-device 18 with adhesives. The heat-shrinkable device 18 may connect to the surge absorber 12 and the first connecting portion 1411 of the first conductor when the first connecting portion 1411 is at the inner surface of the heat-shrinkable device 18. Accordingly, the first connecting portion 1411 may be pulled by the heat-shrinkable device 18 when the heat-shrinkable device 18 shrinks. When the first end of the first conductor 141a is pulled by the shrinkage of the heat-shrinkable device 18, the second connecting portion 1413 is separated from the second conductor 143a, causing the switch device 14 to be switched off.

Figure 4B:
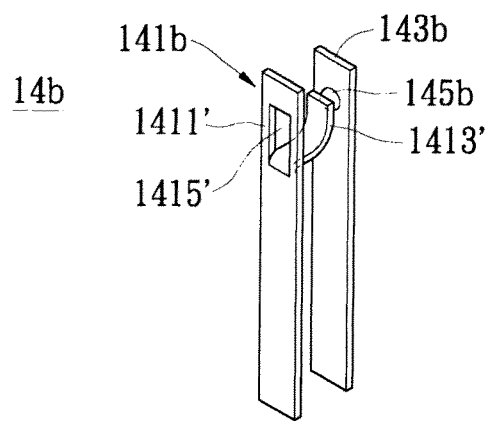
FIG. 4B is a schematic view of a second embodiment of the heat-shrinkable device of the protection circuit in accordance with the present invention.

Referring to FIG. 4B, the difference between the switch device 14b and the switch device 14a in FIG. 4A is that the first connecting portion 1411' of the first conductor 141b is a base portion and the second connecting portion 1413' is an extending portion. Additionally, a contact 145b is disposed on the first end of the second conductor 143b. Alternatively, the contact 145b may also be formed on the second connecting portion 1413'. The cause of the separation of the first conductor 141b from the second conductor 143b is similar to that discussed previously.

Figure 4C:
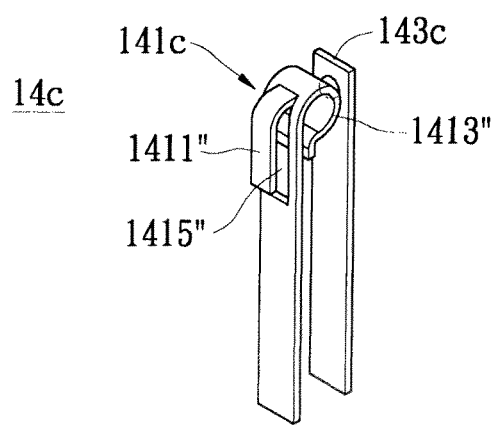
FIG. 4C is a schematic view of a third embodiment of the heat-shrinkable device of the protection circuit in accordance with the present invention.

Referring to FIG. 4C, the difference between the switch device 14c and the switch devices 14a and 14b is that the opening of the slot 1415", which is formed on the first conductor 141c, faces downwardly with the slots in the switch devices 14a and 14b facing upwardly. As such, the first connecting portion 1411" may extend into the inner side of the heat-shrinkable device 18. As with the discussion presented in the previous paragraphs, the cause of the separation of the second connecting portion 1413" from the second conductor 143c may be similar to the embodiments shown in FIGS. 4A and 4B.

Figure 5A:
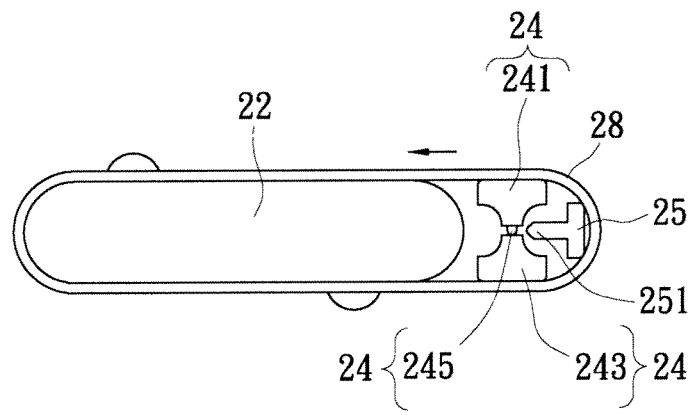
FIGS. 5A to 5B are top views of a second embodiment of the protection circuit in accordance with the present invention.
Figure 5B:
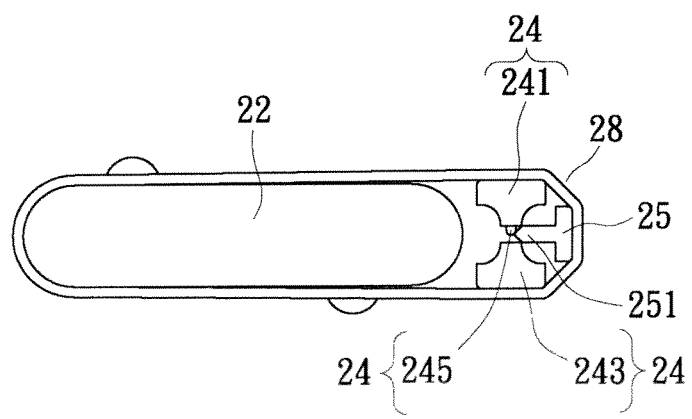

Referring to FIGS. 5A and 5B in which top views of a protection circuit 20 according to one embodiment of the present invention are illustrated. The protection circuit 20 includes a blocking element 25, which is one of the differences compared with the embodiment shown in FIGS. 2A and 2B. And the heat shrinkable device 28 encloses the surge absorber 22, the switch device 24 and the blocking element 25.

In this embodiment, the blocking element 25 is made of an insulting material. The blocking element 25 is movably disposed on a circuit board (not shown). The surge absorber 22 and the switch device 24 are also disposed on the circuit board and electrically connected to each other. The switch device 24 includes a first conductor 241 and a second conductor 243. A contact 245 is disposed between the first conductor 241 and the second conductor 243. The blocking element 25 further includes a protruding portion 251 adjacent to the contact 245, wherein the protruding portion 251 is larger than the contact 245 in size.

Figure 6A:
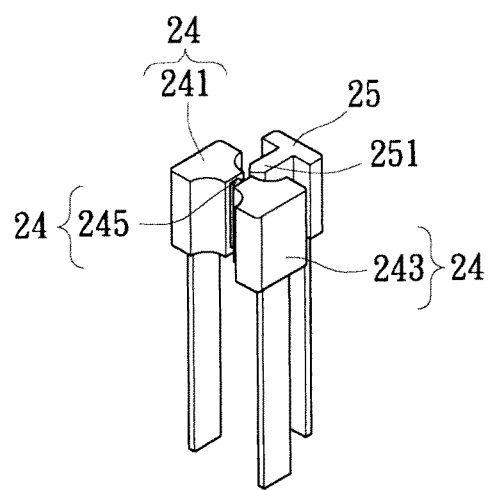
FIGS. 6A to 6B are perspective views of the second embodiment of the protection circuit in accordance with the present invention.
Figure 6B:
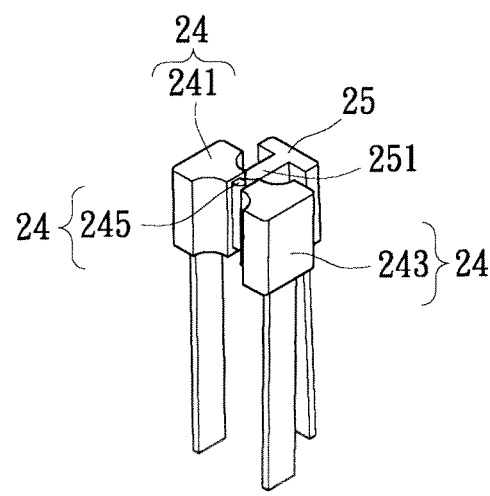

When the temperature of the heat-shrinkable device 28 does not reach the lower limit of the operative temperature range, the first conductor 241 is connected to the second conductor 243 via the contact 245. As shown in FIGS. 5A and 6A, the switch device 24 is switched on. When a surge current passes through the surge absorber 22, the temperature of the surge absorber 22 may raise to further increase the temperature of the heat shrinkable device 28 as the result of heat transmission. When the temperature of the heat shrinkable device 28 reaches the operative temperature range, the heat shrinkable device 28 shrinks. The blocking element 25 is moved by the heat shrinkable device 28 to a position between the first conductor 241 and the second conductor 243 to cause the first conductor 241 no longer in contact with the second conductor 243, as shown in FIGS. 5B and 6B.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A protection circuit, comprising:
a surge absorber;
a switch device electrically connected to the surge absorber and having a first conductor and a second conductor, wherein the first conductor has an end having a first connecting portion and a second connecting portion;
a heat-shrinkable device disposed on an outer periphery of the surge absorber, connected to the first connecting portion and shrinking in accordance with a temperature of the surge absorber, wherein when the switch device is in an initial state, the second connecting portion electrically contacts the second conductor, and when the heat-shrinkable device shrinks, the first connecting portion of the first conductor is moved by a shrinkage of the heat-shrinkable device, and the second connecting portion is separated from the second conductor, causing the switch device to be switched off.

2. The protection circuit as claimed in claim 1, wherein the first connecting portion is an extending portion, and the second connecting portion is a base portion.

3. The protection circuit as claimed in claim 1, wherein the first connecting portion is a base portion, and the second connecting portion is an extending portion.

4. The protection circuit as claimed in claim 1, wherein the first connecting portion is connected an outer surface of the heat-shrinkable device.

5. The protection circuit as claimed in claim 1, wherein the first connecting portion is disposed between the heat-shrinkable device and the surge absorber.

6. The protection circuit as claimed in claim 1, further comprising a contact disposed on the second connecting portion of the first conductor, wherein the first conductor is connected to the second conductor via the contact.

7. The protection circuit as claimed in claim 1, further comprising a contact disposed on the second conductor, wherein the second conductor is connected to the second connecting portion of the first conductor via the contact.

8. The protection circuit as claimed in claim 1, wherein the heat-shrinkable device is a heat-shrinkable sleeve made of polyester or polyvinylchloride.

9. The protection circuit as claimed in claim 1, wherein the heat-shrinkable device has a plurality of vents.

10. The protection circuit as claimed in claim 1, wherein the heat-shrinkable device is attached to the outer periphery of the surge absorber with an adhesive.

11. The protection circuit as claimed in claim 1, wherein when the temperature of the heat-shrinkable device is within a predetermined operative temperature range, the heat-shrinkable device is associated with a predetermined shrinkage rate, and an upper limit of the operative temperature range corresponds to a threshold temperature beyond which the surge absorber fails.

12. A protection circuit, comprising:
a surge absorber;
a switch device electrically connected to the surge absorber and having a first conductor and a second conductor, wherein the second conductor is detachably connected to the first conductor;
a blocking element adjacent to the switch device; and
a heat-shrinkable device disposed around the surge absorber, the switch device and the blocking element, and shrinking in accordance with temperature of the surge absorber, wherein the heat-shrinkable device shrinks to move the blocking element to a position between the first conductor and the second conductor when a temperature of the heat-shrinkable device is within a predetermined operative temperature range.

13. The protection circuit as claimed in claim 12, wherein the upper limit of the operative temperature range is a threshold temperature beyond which the surge absorber fails.

14. The protection circuit as claimed in claim 12, wherein the blocking element is made of an insulating material.

15. A protection circuit, comprising:
a surge absorber;
a switch device electrically connected to the surge absorber and having a first conductor and a second conductor; and
a heat-shrinkable device disposed on an outer periphery of the surge absorber, connected to the first conductor, and shrinking in accordance with temperature of the surge absorber, wherein when the switch device is in an initial state, the second connecting portion electrically contacts the second conductor, and when the heat-shrinkable device shrinks, the first connecting portion of the first conductor is moved by a shrinkage of the heat-shrinkable device, and the second connecting portion is separated from the second conductor, causing the switch device to be switched off.

16. The protection circuit as claimed in claim 15, wherein the heat-shrinkable device is a heat-shrinkable sleeve made of polyester, or polyvinylchloride, and an upper limit of an operative temperature range is a threshold temperature beyond which the surge absorber fails.

* * * * *